United States Patent

Southiere

[15] 3,673,884

[45] July 4, 1972

[54] CHAIN TENSIONING DEVICE FOR SNOWMOBILE TYPE TRANSMISSION

[72] Inventor: Bertrand Southiere, Valcourt, Quebec, Canada

[73] Assignee: Bombardier Limited, Quebec, Canada

[22] Filed: Nov. 16, 1970

[21] Appl. No.: 89,665

[52] U.S. Cl. ............74/242.11 S, 74/242.11 C, 74/242.15 R
[51] Int. Cl. .........................................F16h 7/12, F16h 7/10
[58] Field of Search............74/242.11 S, 242.11 C, 242.15 R

[56] References Cited

UNITED STATES PATENTS

| 3,069,920 | 12/1962 | Cole et al. | 74/242.11 S X |
| 3,490,302 | 1/1970 | Turner et al. | 74/242.11 S |
| 2,210,276 | 8/1940 | Bremer | 74/242.11 S |

FOREIGN PATENTS OR APPLICATIONS 742,092  12/1955  Great Britain....................74/242.11 S

*Primary Examiner*—Leonard H. Gerin
*Attorney*—Larson, Taylor and Hinds

[57] ABSTRACT

The disclosure herein describes a device for tensioning the endless chain of a snowmobile transmission consisting of a pair of hard wear-resistant members which are connected for pivotal movement to the chain case and engage the opposite outer sides of the transmission chain. The members are spring-biased toward opposite intermediate portions of the chain and operate to tighten the chain, each member alternately operating to take the slack in the chain, in one case when the snowmobile is accelerating and, in the other case, when the snowmobile is decelerating or operating in reverse.

3 Claims, 6 Drawing Figures

INVENTOR
Bertrand SOUTHIÈRE

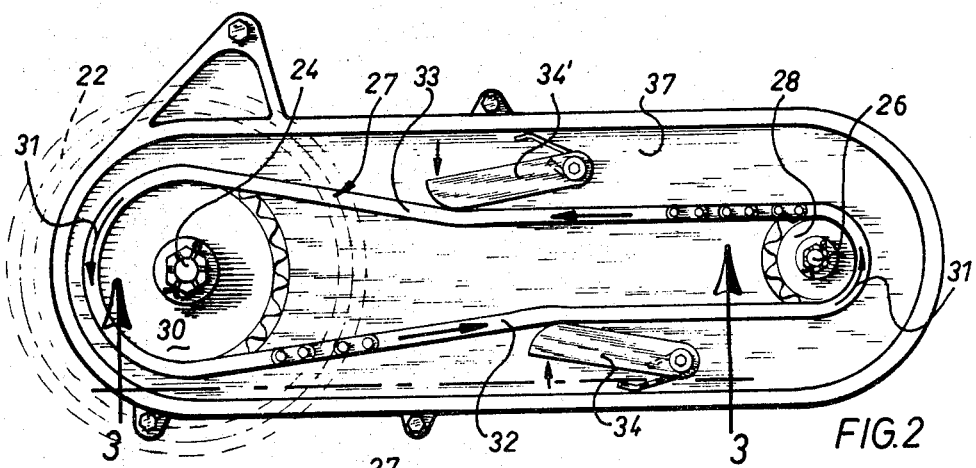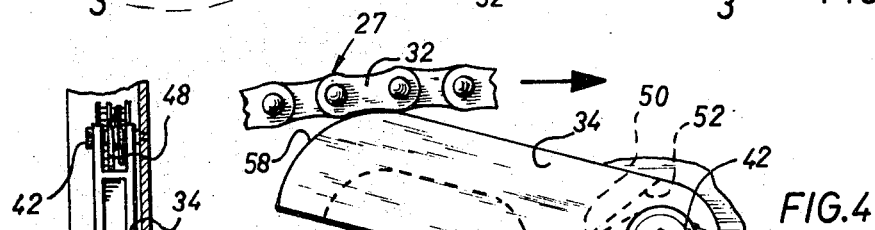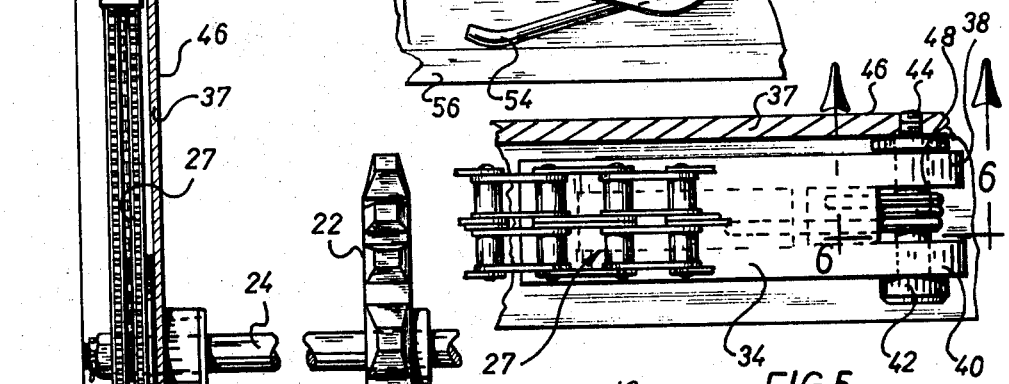

CHAIN TENSIONING DEVICE FOR SNOWMOBILE TYPE TRANSMISSION

This invention relates generally to snowmobile type transmissions; more particularly, this invention relates to a device for tensioning the endless chain of a snowmobile transmission.

In the transmission of present-day snowmobiles, torque developed by an internal combustion engine is transmitted from the driven pulley axle to the belt-engaging sprocket axle by means of an endless chain entrained around a pair of sprockets respectively journaled on each axle. The inevitable wear in the chain as well as in the sprockets renders it extremely difficult to obtain a chain which is constantly under proper tension; a chain which has taken too much slack, slips off the sprockets and breaks. Usually, there is provided to the chain case an eccentric which enables an adjustment of the driven pulley axle relative to the belt engaging sprocket axle to thereby correct the slack in the chain. However, this type of adjustment is an awkward operation for the ordinary snowmobiler to carry out and, in most cases, must be effected by a skilled workman.

It is also known to use an unidirectional chain tensioner which is automatically or manually adjusted to bend one strand of the chain as slack develops. However, this necessitates a relatively complex system and results in excessive wear of the chain.

It is therefore an object of this invention to provide a tensioning device for use on a snowmobile transmission which is simple in construction, which eliminates the need to regularly adjust the tension in the chain and which does not result in excessive wear of the chain.

Furthermore, it must be realized that, when a snowmobile is accelerating, one intermediate side of the endless chain is in tension while the other intermediate side is slack. On the other hand, when the snowmobile is decelerating or operating in reverse, the other side of the chain is in tension while the opposite side is slack.

It is therefore an object of this invention to provide a tensioning device to be mounted in a snowmobile transmission so that the slack in the chain may be taken up whether the snowmobile is accelerating, decelerating or going in reverse.

The present invention relates to a tensioning device for use in a snowmobile type transmission including an endless chain entrained around a pair of spaced apart chain sprockets, comprising a spring biased shoe element adapted to remain in constant engagement with one strand of said chain intermediate said chain sprockets and adapted to exert thereon a force sufficient to prevent slackening of said one strand whenever the opposite strand is transmitting power, a second spring biased shoe element adapted to remain in constant engagement with said opposite strand intermediate the chain sprockets and adapted to exert thereon a force sufficient to prevent slackening of said opposite strand whenever said one strand is transmitting power.

Other advantages will become apparent from the following description and drawings, in which:

FIG. 2 is a front view of an opened chain case showing the tensioning device;

FIG. 3 is a cross-sectional view taken along lines 3—3 of FIG. 2 and additionally showing the belt-engaging sprocket;

FIG. 4 is an enlarged fragmentary front view showing one of the tensioning members exerting a tension on the chain;

FIG. 5 is a top view of the member shown in FIG. 4; and

FIG. 6 is a cross-sectional view taken along lines 6—6 of FIG. 5.

Figure 1:
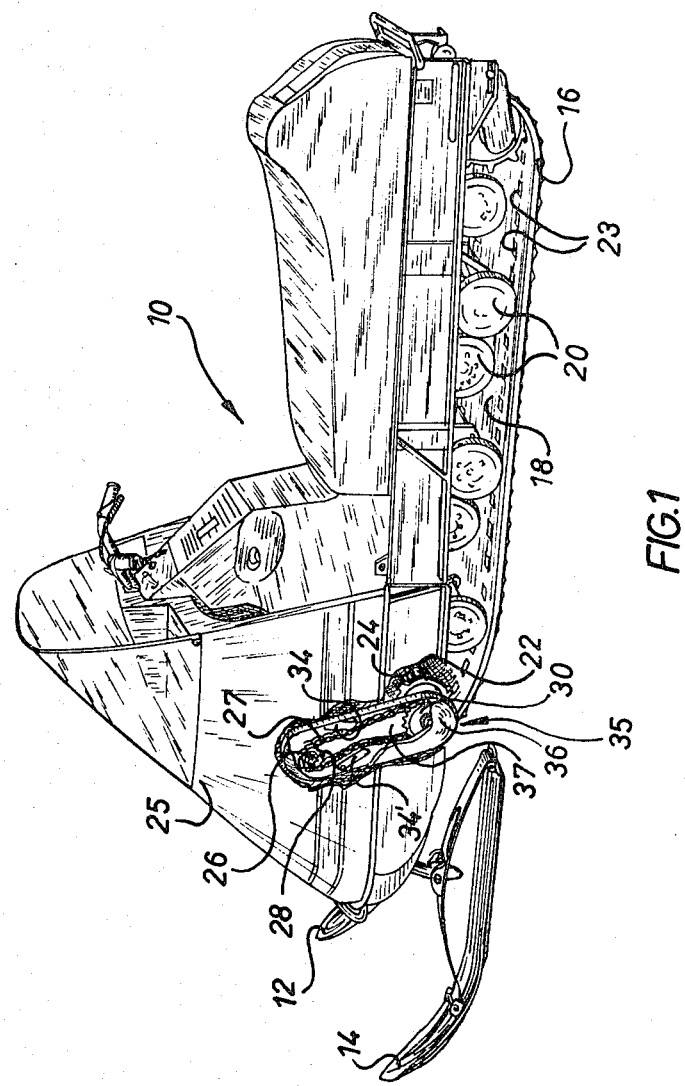
FIG. 1 is a side perspective view of a snowmobile incorporating the present tensioning device.

Referring to FIG. 1 of the drawings, there is shown a conventional snowmobile 10 which is supported at its front end by a pair of parallel ski runners 12 and 14 and at its middle and rear portions by a ground-engaging endless flexible track 16. The weight of the snowmobile body is supported by a plurality of spring-biased bogey wheels 20 disposed on the inside surface 18 of the lower run of the track as shown although other types of suspension systems can be used as will be obvious to the man skilled in the art. The track 16 is conventionally driven by one or more sprocket wheels 22 (depending on the number of series of aligned holes 23) journaled on a horizontally disposed transverse axle 24. The snowmobile is driven by an internal combustion engine (not shown) disposed underneath the cab 25.

The transmission most often found on these snowmobiles consists in a drive expansible pulley (not shown) directly connected to the engine and operatively connected by means of a V-belt (not shown) to a driven expansible pulley (not shown) journaled on an axle 26. The driving sprocket axle 24 is operatively connected to the axle 26 by means of a double link chain 27 which is entrained around a first sprocket gear 28 secured at one end of the axle 26 and around a second sprocket gear 30 secured at one end of the axle 24. Therefore, in the driving system of this snowmobile, torque developed by the engine is transmitted to the endless track 16 via the driven pulley, axle 26, sprocket gear 28, chain 27, sprocket gear 30, axle 24, and sprocket 22.

The sprocket gears 28 and 30 along with the chain 27 are enclosed in a fluid-tight chain case 35 consisting of a cover 36 and a back plate 37; the chain case 35 is formed of a welded casing having access ports, and fluid-tight covers or plugs for the ports.

Chain 27 tends to slacken due to normal wear; the slack is considered to be evenly distributed on both sides of the chain when the snowmobile is at rest (as shown in FIG. 2) but tends to be wholly present on only one side of the chain depending on whether the snowmobile is accelerating or decelerating. For example, as the snowmobile accelerates and as the rotational speed of the chain increases in the direction shown in FIG. 2 by arrows 31, intermediate side portion 32 of the chain will transmit power and thereby be tensioned while intermediate side portion 33 will have all the slack. When the snowmobile is decelerating or operating in reverse, side portion 33 will transmit power and be tensioned while side portion 32 will be slack.

To ensure that chain 27 is constantly under tension, a pair of wear-resistant members or shoe elements 34 and 34' are connected for pivotal movement to the back plate 37 of chain case 35. Each member 34, 34' has at one end thereof two spaced-apart projections 38 and 40, each provided with a transverse hole for receiving a pivot pin 42 which has one end 44 fixed to the rear wall 46 of the back plate 37. Between projections 38 and 40 of the member 34, a torsion spring 48 is mounted on pin 42 and has one end 50 engaging the inclined interior wall 52 of member 34 and the other end 54 engaging the peripheral flange 56 of the back plate 37. The unwinding forces in spring 48 tending to separate the end portions 50 and 54 resiliently bias member 34 on the outer side of the side portion 32 of the chain 27. The torsion which is to be given to spring 48 is predetermined by the desired force to be exerted to the chain. As it now can be seen, during acceleration or deceleration of the snowmobile, any slack in the chain will be taken up either by member 34 or member 34' engaging side portions 32 or 33 and inwardly biasing the chain. Members 34 and 34' are preferably made of hard plastic materials, for example nylon; at least, their chain contacting surfaces 58 and 58', respectively, should be wear-resistant and rounded for optimum sliding and tensioning engagement with the chain.

It has been determined that with the tandem chain tensioner of the invention where only the slack strand of the chain need be effectively tensioned, the other tensioner merely riding along the tightened, rectilinear strand, a relatively low tensioning force suffices to prevent the chain from jumping the sprockets. The result therefore is that the construction of the tensioner can be simplified to very few components, and practically no wear of the contacting chain links and tensioning shoes can develop.

While the invention has been described above, only in relation to one specific form, persons skilled in the art will be aware that it may be refined and modified in various ways without departing from its scope. For example, the shoe elements 34, 34' could be secured to the chain case inside the intermediate side portions 32 and 33 thereof and spring-biased away from each other, or alternately in and out the intermediate side portions 32 and 33 and spring-biased in the same direction; furthermore, the shoe elements could be spring-biased in other fashion than by pivotal movement. It is therefore wished to have it understood that this invention is not to be limited in interpretation except by the terms of the following claims.

What is claimed is:

1. A snowmobile, comprising: a chain case assembly including means for transmitting power from the engine to the endless track of the snowmobile, said assembly including a housing, a pair of spaced-apart parallel shafts, each having one end extending inside said housing at a fixed distance therebetween, means for applying the engine power to one of said shafts for applying torque to said one shaft in a first direction and means for decelerating the said one shaft by applying torque to said one shaft in a second direction opposite to the first direction, the other of said shafts being connected to said endless track by drive sprocket wheel means; sprocket means mounted on each end of said shafts; endless chain means entrained around said sprocket means; said chain means defining opposite first and second intermediate strands extending between said sprocket means; the first intermediate strand being under tension and the second intermediate strand being slack when the engine power is applied to the first shaft in said first direction, and the second intermediate strand being under tension and the first intermediate strand being slack when the decelerating means is applying torque to the first shaft in said second direction, a pair of separate tensioners pivotally mounted to said housing; each said tensioner disposed adjacent an associated intermediate strand and including a shoe element having a wear-resistant surface made of hard material in contact with said associated strand; said tensioners further including spring means for causing each said surface to be maintained in contact engagement with said associated intermediate strand and to exert thereon a force sufficient to take up substantially all slack in said associated strand to maintain said chain means under constant tension independently of the direction of the direction of the torque applied to said one shaft by said applying means and by said declerating means.

2. A chain case assembly as defined in claim 1 wherein each of said spring means consists of a torsion spring mounted around a pivot pin extending through each said tensioner and securing said tensioner to said housing.

3. A chain case assembly as defined in claim 2 wherein said torsion spring has one end portion engaging said tensioner and the other end portion engaging a peripheral flange provided on said housing, the torsion forces in said tension spring tending to separate said end portions of said torsion spring, thereby causing said member to pivot about said pin and to exert a constant tension on an intermediate strand of said chain means.

* * * * *